UNITED STATES PATENT OFFICE.

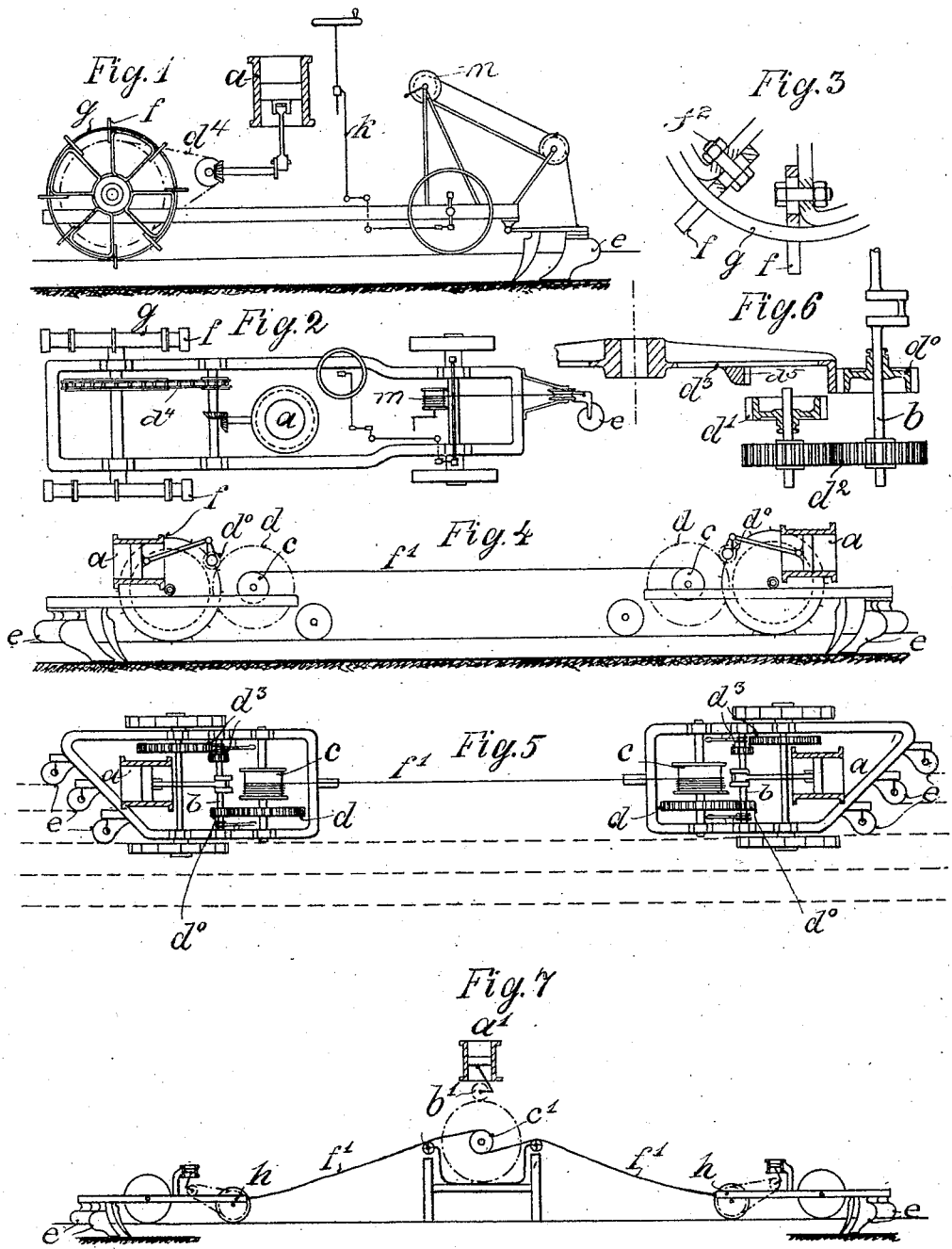

JOSEPH BREY, OF GÖGGINGEN, NEAR AUGSBURG, GERMANY.

PLOW.

936,599.

Specification of Letters Patent.   Patented Oct. 12, 1909.

Application filed October 3, 1904. Serial No. 227,045.

*To all whom it may concern:*

Be it known that I, JOSEPH BREY, engineer, citizen of Germany, residing at Göggingen, near Augsburg, Bavaria, Germany, have invented certain new and useful Improvements in Plows; and I do hereby declare the following to be a full, clear, and exact description of the invention, such as will enable others skilled in the art to which it appertains to make and use the same.

This invention relates to improvements in plows, the word being used generically to include agricultural implements in general, and has for its object the provision of a motor operating thereon by suitable connections in such manner as to render the employment of motor-plows advantageous and economical for use in agriculture on either a large or small scale.

In the accompanying drawings, I have illustrated my invention as embodied in several modifications.

In these drawings Figure 1 is an elevation of a motor-plow, the motor being carried by, and operating directly to propel the plow; Fig. 2 is a plan view of Fig. 1; Fig. 3 is a fragmentary detail of the traction wheel. Fig. 4 is an elevation of two coöperating motor-plows embodying my invention; Fig. 5, is a plan view of Fig. 4; Fig. 6 is a fragmentary detail showing the gearing; and Fig. 7 is an elevation showing another modification of my invention.

Common to all of the modifications is the motor-plow carrying at its rear portion the plow-shares, roller disk, or other tools $e$ for tilling the soil which may be lifted entirely free from the ground by means of winch $m$ shown in Figs. 1 and 2 and which are caused to penetrate the ground at a greater or less distance as desired, under the control of the adjusting mechanism connected therewith. The plow is steered by means of the mechanism $k$ in a well known manner.

At the opposite end of the plow, are located traction wheels $g$ provided with slotted resistance members $f$ extending radially therefrom and adjustable by means of bolts $f^2$ in such manner that they may be withdrawn entirely within the periphery of the wheel when traveling over hard roads and the like.

According to Figs. 1 and 2, the motor $a$ is carried by the plow and connected by suitable belt $d^4$ with the drive-wheels, thus constituting a self-contained motor-plow adapted for use particularly upon small agricultural estates.

In Figs. 4 and 5 are shown two motor plows arranged to operate in pairs. Each plow is provided near the front end with a winding drum $c$, provided with gear $d$ which meshes with another gear $d^0$ carried by the main shaft $b$ which is driven from the motor $a$. Each plow is also provided upon the shaft $b$ and upon the driving wheel axle with gears $d^3$, which latter gears may be thrown into or out of engagement as desired by a suitable clutch device.

For operation, the two plows are placed at opposite sides of the field, their respective winding drums being connected by cable $f'$. The gears $d^3$ being out of engagement, the motors are started and the cable wound upon each drum, thus drawing the plows toward each other until they meet in the center of the field. By this arrangement, the employment of an anchor for each plow is obviated, one plow serving as a yielding reaction member for the other. If one plow offers more resistance, due to the nature of the ground or any other cause, and consequently tends to travel slower than the other plow, their relative speeds may be controlled by setting the plow-shares to penetrate the ground more or less deeply as the case may be. When the plows meet in the center of the field, the gears $d^3$ are thrown into engagement and the plows returned to the starting point. It will be obvious that the motor being relieved of the resistance of the plows, which are now elevated, the return speed will be naturally much greater without special gearing.

In some cases, it may be advantageous to apply the energy of the motor to the driving-wheels as well as to the winding drum to advance the plows. This may be done, as shown in Fig. 6, by providing the gear-wheels $d^3$, in addition to its outer toothed rim, with an inner toothed rim $d^5$ with which the gear-wheel $d'$ driven by intermediary gearings $d^2$ from the main shaft $b$ is arranged to be thrown into and out of mesh at will.

If it is desired to have the plows meet at a greater or less distance to one side from the center of the field, such result may be accomplished by coupling the motor of one plow to the drive wheels and drum, and the other to the drum alone, in the manner described, or by any well known means for increasing the resistance of one plow relative to the other. This may be carried to the extent of causing one of the plows to remain stationary. In either case each plow serves as an anchorage or reaction member, stationary or more or less movable, for the second plow, toward which anchorage the second plow is drawn by means of the cable $f'$. Obviously, one of the plows may be dispensed with entirely and the cables secured to any other suitable anchorage, such as a tree or grappling irons fixed in the soil.

In Fig. 7 is illustrated a modification by which the winding motor $a'$ is mounted upon a separate car in the center of the field and connected by the gearing $b'$ with a winding drum $c'$ upon which the cable joining the two plows is wound, thus drawing the two plows simultaneously toward the centrally disposed motor. In this case, the plow end of the cable is connected directly with the plow frame at $h$, the plows not being provided with winding drums as in the previous case. In this construction, as also in that shown in Figs. 4 and 5, a winch is employed to elevate the plow shares, but it is omitted from the drawing. In this modification, each plow is provided with a motor for returning the same to the starting point, which motor may be comparatively light, as it has nothing to do with the plowing operation. As the strain is exerted upon the centrally arranged motor car and winding drum equally in both directions equilibrium of the same is maintained and it need not be any heavier than is necessary to support a motor of sufficient power to draw the plows.

Having thus fully described my invention, what I claim as new and desire to secure by Letters-Patent of the United States is:

1. In an agricultural implement, a plow, a winding drum carried thereby, a cable secured at one end to the drum and at the other end to a suitable reaction member, a motor mounted on the plow and geared to the drum for winding up the cable on the drum to draw the plow forward, and a disengageable reverse driving connection between the motor and the drive wheels of the plow to return the same to the starting point.

2. In an agricultural implement, a pair of plows, a cable directly connecting the two plows, a motor carried by each plow, and means driven by the motors for hauling in the cable to draw the plows together.

3. In an agricultural implement, a plurality of plows, a motor carried by each plow, a winding drum driven by each motor, a cable directly connecting the drums on the two plows to draw the plows together, and a disengageable reverse connection between each motor and the drive wheels of its respective plow to return the plows to their separated position.

4. In an agricultural implement, a plow, a winding drum carried thereby, a cable secured at one end to the drum and at the other end to a suitable reaction member, a motor mounted on the plow and geared both to the drive wheels of the plow and to the drum for winding up the cable on the drum to move the plow forward, and a disengageable reverse driving connection between the motor and the drive wheels of the plow to return the same to the starting point.

In testimony whereof I hereunto affix my signature in the presence of two witnesses.

JOSEPH BREY.

Witnesses:
 HUGO WEGELIN,
 A. HUCKER.